July 7, 1964  C. W. JOHNSTON  3,140,385
ARC WELDING AND FILLER ROD SHAPE
Filed Sept. 1, 1961  2 Sheets-Sheet 1

Charles W Johnston

July 7, 1964  C. W. JOHNSTON  3,140,385
ARC WELDING AND FILLER ROD SHAPE
Filed Sept. 1, 1961  2 Sheets-Sheet 2

United States Patent Office 3,140,385
Patented July 7, 1964

3,140,385
ARC WELDING AND FILLER ROD SHAPE
Charles W. Johnston, 7508 Kress Ave., Bell, Calif.
Filed Sept. 1, 1961, Ser. No. 135,523
5 Claims. (Cl. 219—137)

This invention relates to butt weld joints and to a means and method of producing same.

It has heretofore been the practice in fabricating butt weld joints, as in butt joining the margins of the walls of tubes, panels and the like, to interpose a consumable insert of weld metal between the wall margins to be joined and to subsequently fuse the insert together with the adjacent portions of the wall margins by the application of a welding arc and thereby unite the margins by the desired weld joint.

The insert commonly employed embodies a root portion comprising an upstanding rib or web having a flange or bead on its lower margin of which the rib or web is designed to extend between the faces of the adjacent margins of the walls to be joined while the flange or bead is designed to underlie the under or non-working sides of the walls along such margins. This arrangement necessitates application of the insert either from the underside of the walls or from an end of one of the walls and prevents application of the inserts from the upper or outer sides of the walls.

The present invention contemplates the use of a consumable insert embodying a web portion wherein the bead or flange is eliminated, and whereby the web portion may be applied from the exterior of the walls to be joined.

The primary object of the invention is to provide a construction in the insert which will function in co-operation with a preformed beveled contour of the margins of the walls to be joined to facilitate its proper positioning between the margins as in serving as a stop to limit the extent of protrusion of the insert web into or through the gap between the wall margins, also to effect alignment of the adjacent wall margins relative to each other and compensate for mis-alignment resulting from out of roundness or difference in sectional thickness of the wall margins to be joined.

This construction resides in forming one margin of the insert web with opposed outwardly inclined or diverging integral flanges which are adapted to overlie and be seated upon and conform to the correspondingly beveled faces on the outer faces of the marginal portions of the walls to be joined, such beveled faces forming the usual butt weld groove.

In addition to the functions above recited, the diverging flanges on the insert serve to assure a metal to metal contact between the insert and the walls to be joined at all points along the bottom of the butt weld groove, thereby avoiding air gapping, or spacing, between the mating surfaces. This action further ordinarily serves to effectively seal an otherwise open joint such that there will be a complete elimination of atmospheric contamination of the purging gas at the time of welding.

A further object of the invention is to provide a method of forming a butt weld joint employing a consumable insert wherein portions of the insert may be progressively seated under pressure on the wall margins to be joined immediately in advance of the welding arc utilized in fusing the insert and adjacent portions of the wall margins together, so as to force the web portion of the insert into the root area between the wall margins and thereby maintain metal to metal contact between the insert and the wall margins and thus assure complete coalescence of the insert and the base metal of the surfaces of the wall margins in the root area of the produced weld.

With the foregoing recited objects and advantages in view together with such other objects and advantages as may subsequently appear, the invention resides in the novel constructions and arrangements, and in the several steps hereinafter specified, called for in the annexed claims, and illustrated by way of example in the accompanying drawings, in which:

Figure 1:
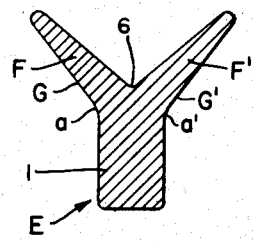
FIG. 1 is a diagram in cross section of the consumable insert.

Referring to the drawings more specifically A–A' indicate generally marginal portions of base metal walls designed to be united by a butt weld joint. The wall portions A–A' have straight end faces B–B' which are designed to be presented face to face, preferably in relative alignment, and disposed in parallel slightly spaced relation to each other. The wall portions A–A' also have outer and inner sides indicated at C–C' and D–D' respectively, and have the outer sides of their adjacent ends beveled or chamfered to form opposed outwardly inclined faces 2–2' diverging from the end faces B–B' to form the conventional weld receiving V-groove usually provided along the contiguous margins of the walls to be welded.

In carrying out the present invention an insert E of special contouring is provided for positioning between the adjacent ends of the wall portions A–A' which insert is formed of weld metal and is designed to be melted throughout and fused into incorporation with the contiguous surfaces of the base metal wall portions A–A'. The insert E is Y-shaped in cross section, it embodying a web 1 of general rectangular cross section having smooth flat side faces and including diverging flanges F–F' projecting upwardly and outwardly from the upper margin of the web, which web and flanges extend continuously throughout the length of the insert. The web 1 is designed to be interposed between the lower portion of the butt edges of walls to be joined to occupy what is commonly known as the root area, and the insert E is designed to be fused in toto to produce a root bead fused into and uniting the butt edges of the walls. The flanges F–F' are preferably convergent transversely thereof with their undersides G–G' flat and smooth surfaced and extending at inclinations corresponding to the inclinations of the beveled faces 2–2' of the wall portions A–A' on which faces the flanges F–F' are designed to be seated. The flanges F–F' border and define a V-channel 6 extending longitudinally of the insert throughout the length thereof into which a welding arc 7 is directed from the electrode 5 of a welding torch 4 in effecting fusion of the insert E and the base metal of the marginal wall portions A–A', as will presently be described. The channel 6 also serves as a guideway for a roller 3 whereby the insert E may be held under pressure in its seated position on the wall portions A–A' in advance of and during the welding operation.

While the proportions and dimensions of the insert E are subject to variation in order to conform to the dimensions of the particular wall margins to which the insert is to be applied, the dimensions in inches of an insert E of average size is as follows:

| | |
|---|---|
| Lateral thickness of the web 1 being | .062" |
| Height of the web 1 being | .109" |
| Height of the inset over-all being | .218" |
| Width of the inset at the outer ends of the flanges F-F' being | .218" |

Figure 3:
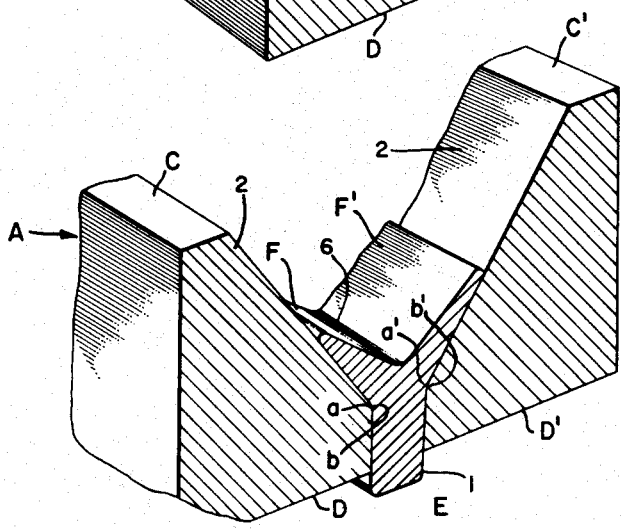
FIG. 3 is a diagram similar to FIG. 2 showing the parts assembled in readiness for application of a welding torch.

The base margins a-a' of the inclined lower faces of the flanges F-F' intersect the side faces of the web in opposed relation to each other so as to normally abut the intersection of the upper margins b-b' of the end faces B-B' with the inclined faces 2-2' when the insert is positioned between properly aligned wall portions A-A' as shown in FIG. 3. As here shown, when the insert is so positioned the lower margin of the web 1 will preferably protrude a short distance from the under sides D-D' of the wall portions A-A', the web 1 being of a height between its lower margin and its intersection a-a' with the undersides of the flanges F-F' slightly larger than the heights of the end faces B-B'.

Figure 2:
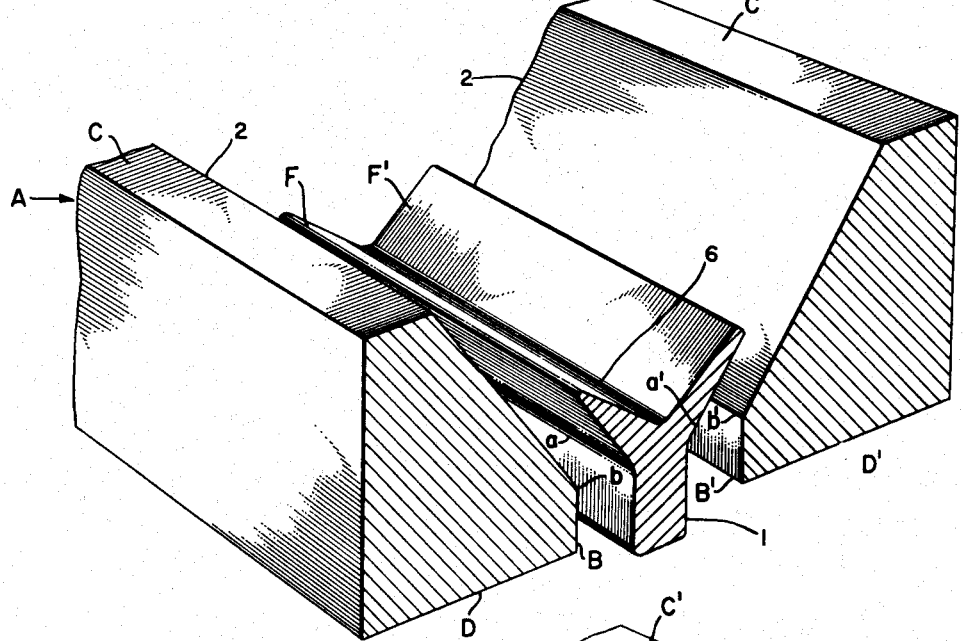
FIG. 2 is an exploded schematic isometric view of a typical assembly showing the relationship of the insert and the margins of walls to be joined.

In carrying the invention into effect in the production of a weld joint, the insert E is initially positioned between spaced apart ends of the wall portions A-A' as depicted in FIG. 2, that is with the web 1 of the insert interposed between the end faces B-B' and with the flanges F-F' of the insert overlying the inclined or beveled upper faces 2-2' of the wall portions A-A' which latter are then advanced toward each other to bring the end faces B-B' thereof into intimate surface contact with the opposed flat side faces of the web 1 and with the underside of the flanges F-F' seating on and conforming to the inclined faces 2-2' as shown in FIG. 3. This placement of the insert E is generally effected in inserting the web 1 edgewise between spaced end faces B-B'' from the exterior of welding sides C-C' of the wall portions A-A' in case the wall portions A-A' are straight as where constituting the margins of flat sheets, but in some instances the insert E may be applied sideways to the end face B or B' of one of the wall portions A-A' to dispose the insert thereagainst after which the end face B or B' of the other wall portion A-A' is advanced into abutting engagement with the insert, particularly where the wall portions A-A' are curved as in the case of cylindrical tubing.

When the parts are thus assembled, it may be desirable in some cases to spot weld the flanges F-F' to the wall portions A-A' at intervals along the length of the insert but in many instances such multiple tacking may be dispensed with. However it is desirable to securely hold the insert in place during welding thereof which, in carrying out the present method, is accomplished by the employment of a roller 3, as shown in FIG. 4, such roller being seated in the channel 6 of the applied insert E and imposed on the flanges F-F' under pressure in any suitable manner so as to press the under sides of the flanges into close superficial contact with the beveled surfaces 2-2' of the wall portions A-A' thereby establishing intimate metal to metal contact between the flanges and wall portions with desired exclusion of air from therebetween.

Figure 4:
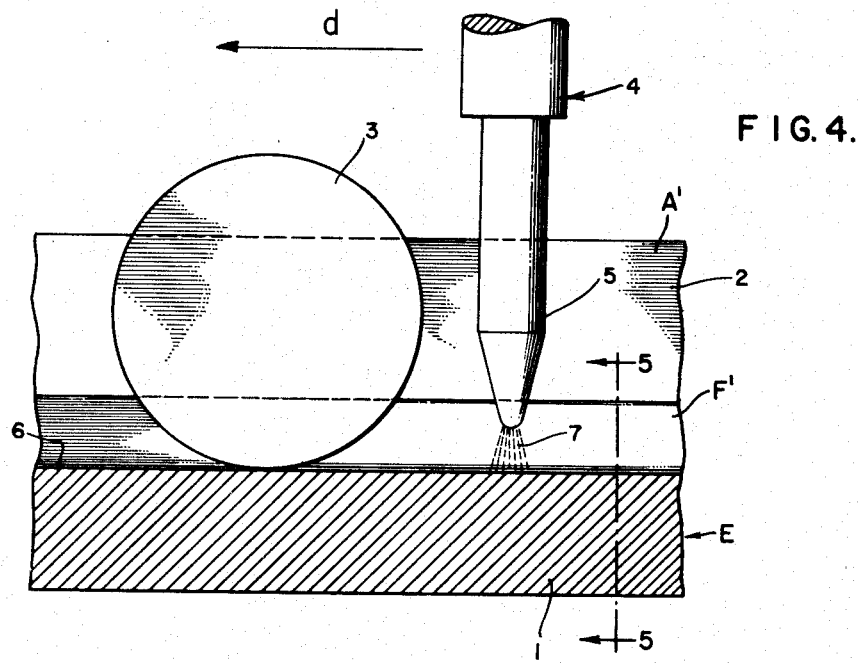
FIG. 4 is a central longitudinal section of the assembly shown in FIG. 3 depicting instrumentalities employed in association with the assembly in effecting the welding operation.
Figure 5:
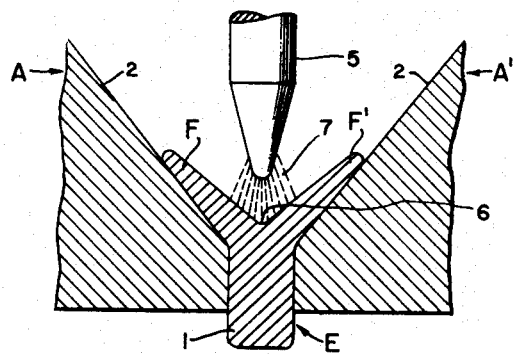
FIG. 5 is a cross section and elevation as seen on the line 5—5 of FIG. 4 showing the manner of directing the welding arc onto the insert in effecting fusion thereof.

While thus impressing the flanges the welding arc 7 is directed into the channel 6 at a point contiguous the point of application of the roller 3 as indicated in FIG. 4. The electrode 5 is then manipulated so that fusion of the insert E and adjacent surfaces of the wall portions A-A' will be effected, whereupon the roller 3 and electrode 5 are advanced collectively along the channel 6 with the roller 3 in the lead, as indicated by the arrow d in FIG. 4. The advance of the roller and welding electrode is at a rate of travel determined by and in accordance with the time consumed in effecting requisite fusion of the insert E throughout together with contiguous portions of the base metal wall portions A-A'.

Figure 6:
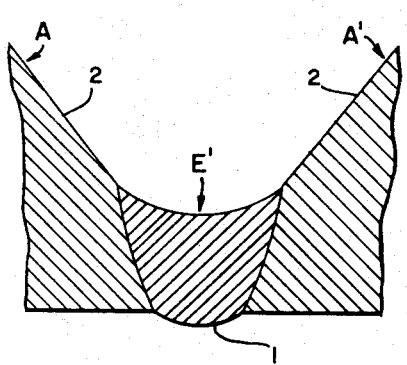
FIG. 6 is a detail in cross section depicting the complete weld joint.

This operation may be timed so as to be continuous or nearly so. The finished weld joint is depicted in FIG. 6 wherein the insert E is shown as consumed and converted into a solidified bond or root bead E' uniting the wall portions A-A' the end margins of which have been fused and commingled with the metal of the consumed insert E.

The above recited fusion action is that incident to conventional welding operations but by reason of the recited construction of the insert E and of the mode of its application certain advantages are attained over welding operations now generally practiced. Among these advantages are the following:

(a) On applying the insert E to one end B-B' of a wall portion A-A', the inclined flanges F-F' co-act with the margins b-b' on bringing the end B-B' of the other free wall portion A-A' against the insert, to bring the wall portions A-A' into alignment.

(b) The splayed flanges F-F' constitute a V-seal acting to close any clearance or air gap as may be present between the sides of the web 1 and the ends B-B' of the wall portions A-A', thereby effecting a complete elimination of atmospheric contamination of the purging gas at the time of welding, with a corresponding reduction of oxidation or chrome oxide discoloration of stainless steel.

Figure 7:
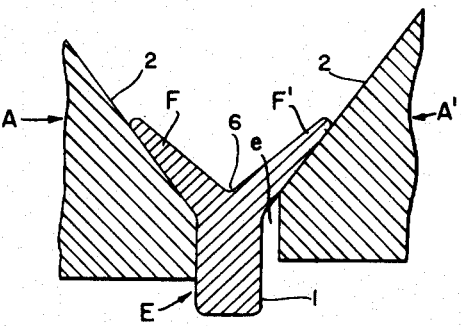
FIG. 7 is a detail in cross section illustrating the manner in which the weld insert is adapted for application to a condition where discontinuity or mis-alignment exists between the wall margins to be welded together.

(c) Where a discontinuity or mis-alignment of the ends B-B' exists, the insert E, by reason of the flanges F-F' thereof, will compensate therefor as indicated in FIG. 7, wherein one of the flanges F is shown as spanning a gap e developed between one side of the web 1 and the adjacent end B' occasioned by the latter being upwardly offset relative to the other end B. On fusing flange F' spanning the gap e the metal of such flange will flow into the gap e together with fused metal of the web 1 such as to close the gap and effect fusion of the offset end B'.

(d) The provision of the splayed flanges F-F' with the resulting channel 6 admits of the application of pressure as by means of a roller 3 immediately in advance of or contiguous to the welding arc to insure close metal to metal contact at the point of arc application thereby minimizing interruption of surface to surface heat flow.

(e) Forming the root web 1 with the upwardly projecting flanges F-F' locates the major volume of the insert in the upper portion of the root area with only a slight protrusion of the web beyond the inner side of the structure. This minimizes dependence on capillary action to draw the inner or lower marginal portion of the molten insert upward into the root area in forming the root bead E'.

(f) By the employment of the recited invention complete coalescence of the metals subjected to the action of the welding arc may be readily effected, thus enabling the production of uniform weld joints of optimum quality.

I claim:

1. The method of butt welding margins of the walls of tubes, panels and the like, consisting in (a) initially forming the walls with chamfered parallel edges whereby when said walls are arranged with the chamfered edges thereof presented edgewise toward and contiguous each other opposed outwardly inclined surfaces will lead from such contiguous edges, (b) providing an insert of weld metal having a longitudinal base web of rectangular cross section one margin of which is formed throughout the length thereof with diverging flanges bordering a channel of V-cross section, (c) interposing the web of said insert between aligned chamfered edges of said walls with opposite sides of said web facing said edges and with said diverging flanges overlying and seating on said outwardly inclined surfaces, and (d) fusing said insert throughout together with marginal portions of said walls contiguous thereto into a root bead uniting said wall portions.

2. The method of butt welding margins of the walls of tubes, panels and the like, consisting in
   (a) initially forming the walls with chamfered parallel edges whereby when said walls are arranged with the chamfered edges thereof presented edgewise toward and contiguous each other opposed outwardly inclined surfaces will lead from such contiguous edges,
   (b) providing an insert of weld metal having a longitudinal base web of rectangular cross section one margin of which is formed throughout the length thereof with diverging flanges,
   (c) interposing the web of said insert between aligned chamfered edges of said walls with opposite sides of said web facing said edges and with said diverging flanges overlying and seating on said outwardly inclined surfaces,
   (d) pressing said flanges into intimate superficial contact with said surfaces, and
   (e) directing a welding arc into and along said channel to thereby fuse together said flanges, web, and the contiguous marginal portions of said chamfered edges into a root bead uniting said edges.

3. The method of butt welding aligned margins of the walls of tubes, panels, and the like consisting in
   (a) providing an insert of weld metal comprising an elongate root web of rectangular cross section having angularly inclined flanges extending along and throughout one margin thereof,
   (b) interposing said insert between aligned margins of opposed walls with said margins abutting opposite sides of said web and with said inclined flanges seating on outer faces of said walls,
   (c) holding a portion of said flanges under pressure in close contact with the outer faces of said walls, and
   (d) fusing said insert adjacent the held portion thereof together with contiguous portions of said wall.

4. The method of butt welding aligned margins of the walls of tubes, panels, and the like consisting in
   (a) providing an insert of weld metal comprising an elongate root web of rectangular cross section having angularly inclined flanges extending along and throughout one margin thereof,
   (b) interposing said insert between aligned margins of opposed walls with said margins abutting opposite sides of said web and with said inclined flanges seating on the outer faces of said walls,
   (c) imposing advancing pressure on said flanges along the lengths thereof, and
   (d) co-incidently applying an advancing welding arc to said flanges contiguous said imposed pressure to thereby fuse said insert together with marginal portions of said walls progressively along the length of said insert.

5. The method of butt welding aligned margins of the walls of tubes, panels, and the like, consisting in
   (a) providing an insert of weld metal comprising an elongate root web of rectangular cross section having angularly inclined flanges extending along and throughout one margin thereof,
   (b) interposing said insert between aligned margins of opposed walls with said margins abutting opposite sides of said web and with said inclined flanges seating on the outer faces of said walls,
   (c) imposing pressure on a portion of said flanges to hold said portion in superficial contact with the outer faces of said walls at a point along the length of said insert, and
   (d) fusing said insert adjacent the point of holding said insert to thereby fuse a portion of said insert and adjacent portions of said walls together thereby producing a root bead uniting said walls.

References Cited in the file of this patent
UNITED STATES PATENTS

| | | |
|---|---|---|
| 1,981,850 | Fisher | Nov. 27, 1934 |
| 2,792,490 | Risch et al. | May 14, 1957 |